Jan. 29, 1963     T. R. THOMAS     3,075,615
LUBRICATION
Filed July 27, 1959     3 Sheets-Sheet 1
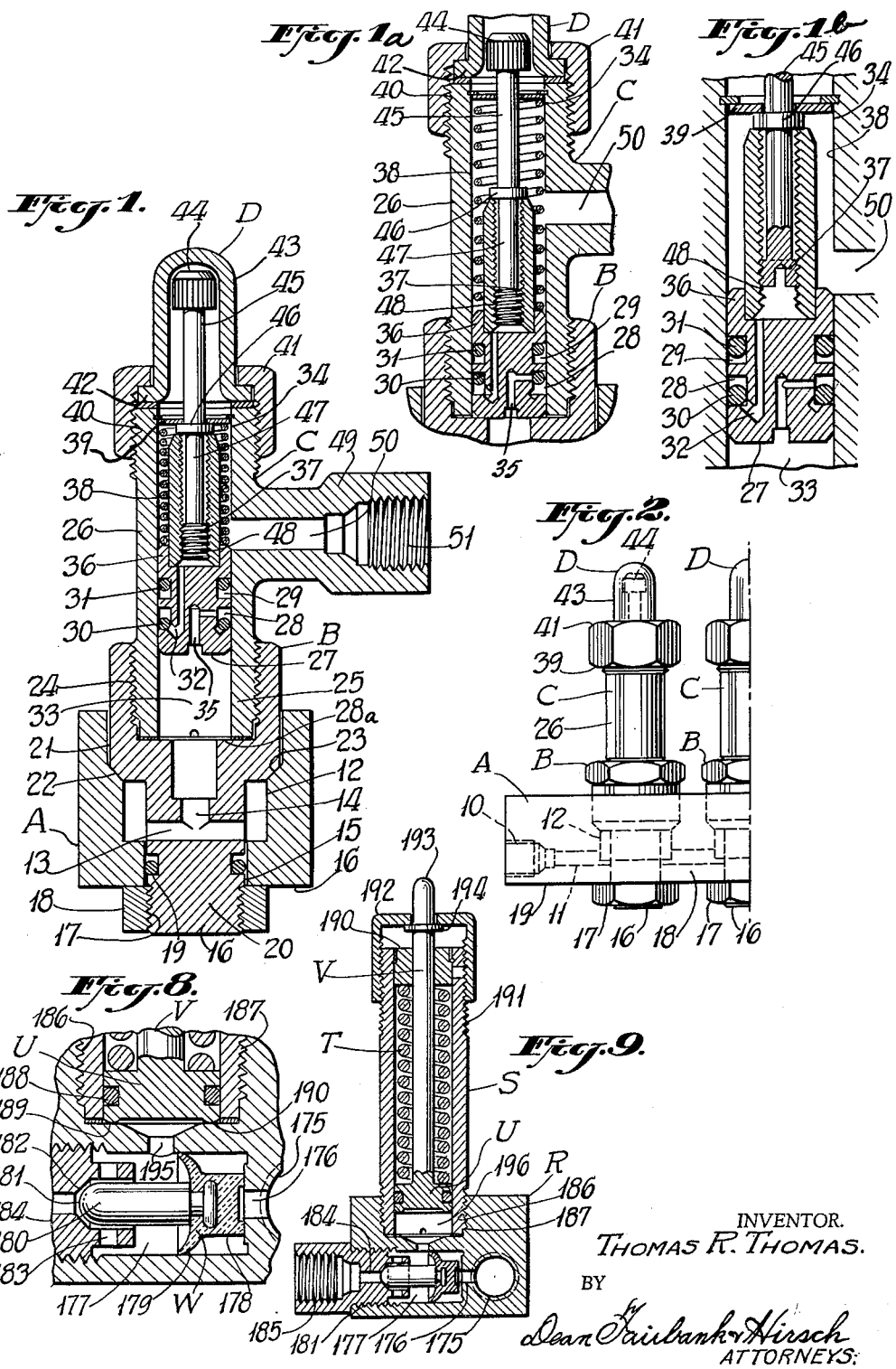
INVENTOR.
THOMAS R. THOMAS.
BY
Dean Fairbank & Hirsch
ATTORNEYS.

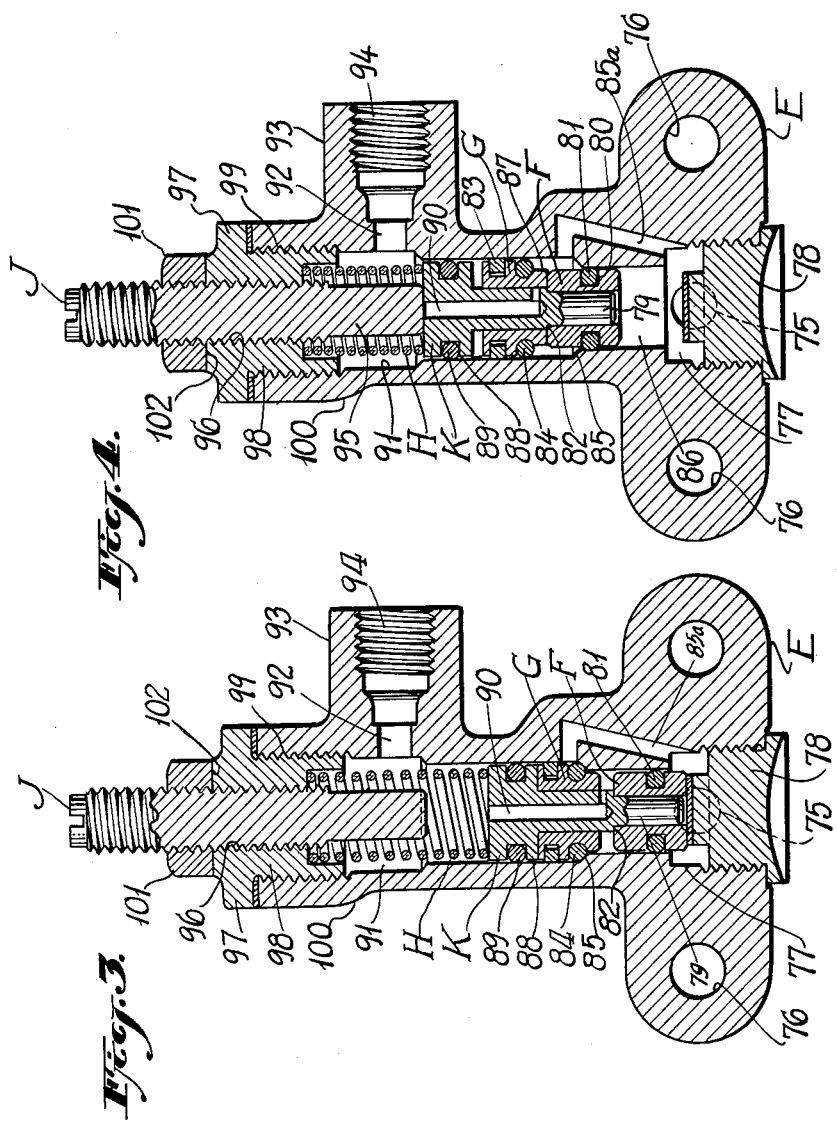

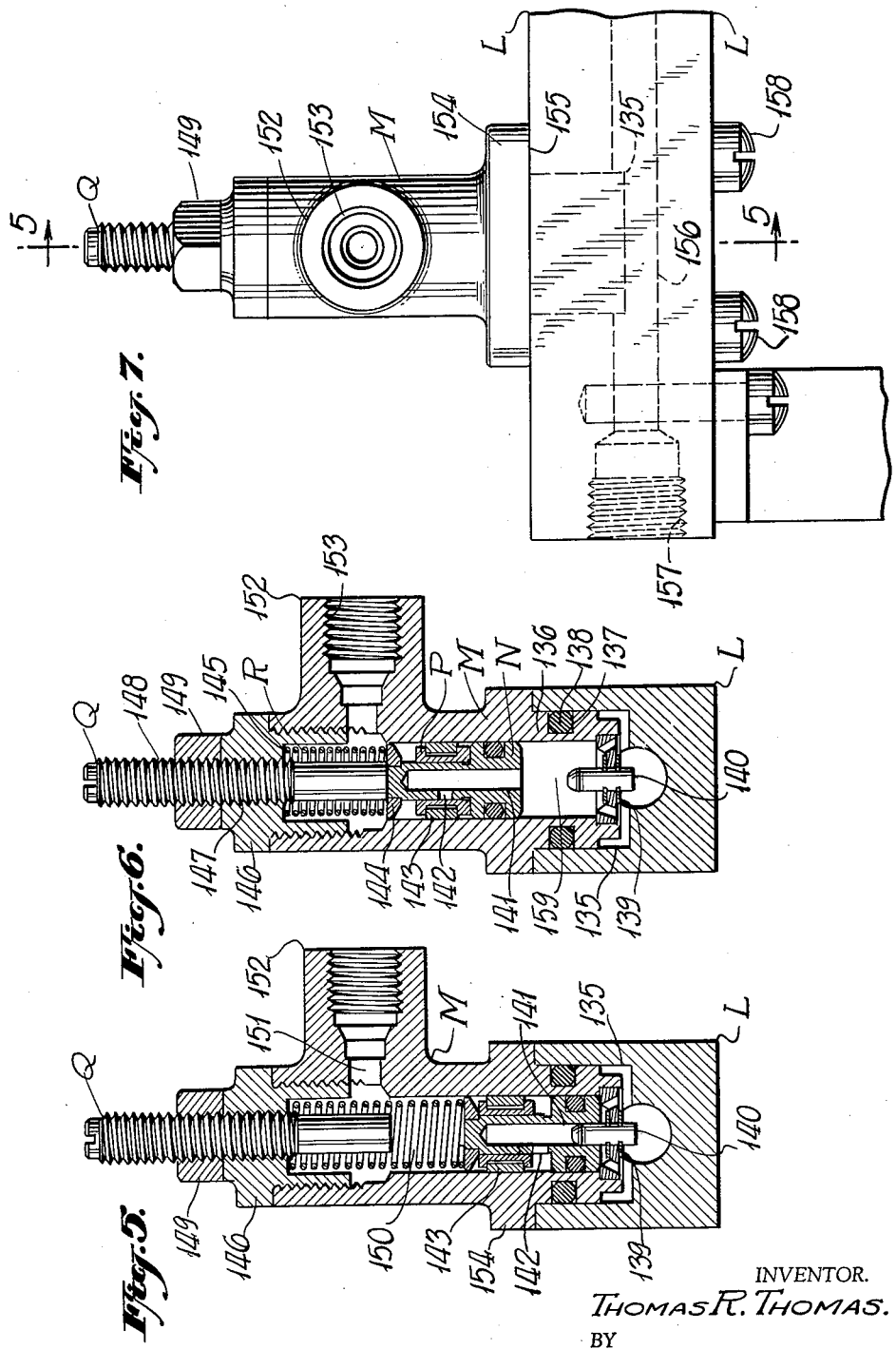

United States Patent Office 3,075,615
Patented Jan. 29, 1963

3,075,615
LUBRICATION
Thomas R. Thomas, New York, N.Y., assignor to Auto Research Corporation, Dover, Del., a corporation of Delaware
Filed July 27, 1959, Ser. No. 829,754
2 Claims. (Cl. 184—7)

The present invention relates to centralized lubricating installations and it particularly relates to centralized lubricating installations in which predetermined proportions of lubricant are distributed to and discharged from controlled outlets associated with bearings to be lubricated from a central source.

It is among the objects of the present invention to provide a centralized lubricating installation which will distribute predetermined quantities of lubricant to a plurality of bearings, which may be distributed in or around a mechanism at different levels and different locations in respect to the central lubricant pressure supply or source.

It is among the further objects of the present invention to provide a centralized lubricating installation which will assure such predetermined distribution of lubricant incidental to forcing of a double shot of lubricant under substantial pressure into an inlet of the system, with the lubricant being conveyed to the dividing or distributing outlets through a plurality of branch or distributing conduits.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to provide a reciprocating piston outlet measuring valve device associated with each bearing to be lubricated, which will first receive and store a predetermined charge of lubricant in a piston cylinder combination.

In the preferred form, the stored charge is received upon application of the pressure charge or pressure input at the central source, and then after release of pressure the measuring valve or piston cylinder combination is actuated so as to release the lubricant to the bearing.

In the preferred form there is a double piston arrangement, spring return, which will seal the outlet upon the pressure charge and storage cycle and which will subsequently return under the stress of the charged spring, transferring the lubricant to the outlet end of the device and releasing it to the bearing.

Each piston cylinder combination of each measuring valve is desirably provided with an inlet storage chamber which is filled upon the pressure charge, and with an outlet discharge chamber which is filled through passageways in the piston structure when the piston is returned and the lubricant is transferred from the storage chamber to the outlet chamber, both of which are in the same cylinder and are on opposite sides of the piston.

Desirably, each piston has a sliding member which will close off the transfer passage upon the storage cycle or pressure charge.

This transfer passage will then be opened upon the release of pressure at the central pressure source, following which the lubricant will be transferred and then passed to the bearing.

The measuring valve or piston cylinder combination of each bearing may also be provided with an indicator device which will indicate when the piston has received or is receiving its charge and which will subsequently release the lubricant charge to the bearing to be lubricated.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a transverse longitudinal sectional view of a metering valving device, according to the present invention, showing the piston at the end of its charging cycle stroke in its position after each measuring device has received a charge of lubricant from the central source.

FIG. 1a is an enlarged cross sectional view of the reciprocating piston structure of FIG. 1.

FIG. 1b is a cross sectional view similar to FIG. 1 but showing the piston at the other end of its stroke before the pressure is applied from the central source.

FIG. 2 is a side elevational view of a series of units such as those shown in FIG. 1 mounted in side by side relationship upon a junction fitting to supply a plurality of bearings.

FIG. 3 is a longitudinal sectional view of an alternative embodiment, showing the piston at the end of its return stroke before pressure has been applied thereto from a central source.

FIG. 4 is a longitudinal sectional view similar to FIG. 3 except showing the piston in an upper position after lubrication has been forced into the storage chamber, and with the spring compressed to force a return of the piston.

FIG. 5 is a longitudinal sectional view of a still further embodiment, showing the piston in its down position before a pressure lubricant supply thereto, taken upon the line 5—5 of FIG. 7.

FIG. 6 is a longitudinal sectional view similar to FIG. 5, showing the piston in lifted position after it has received a charge of lubricant and before such charge has been transferred to the bearing.

FIG. 7 is a side elevational view of the unit of FIGS. 5 and 6, as mounted upon a junction fitting.

FIG. 8 is a fragmentary transverse longitudinal sectional view showing a still further alternative form of metering valve with the piston being in the home position before a charge of lubricant has been supplied thereto.

FIG. 9 is an alternative sectional view similar to FIG. 8, upon a smaller scale than FIG. 8, showing the elevation of the piston after a charge of lubricant has been supplied thereto and before such charge has been discharged to a bearing, with both the storage chamber and the discharge chamber being on the same side of the piston.

Referring to the embodiment of FIGS. 1 and 2, there is shown a junction fitting A carrying a series of adapter units B, which in turn carry a series of metering valving units C provided with connecting transparent domes D.

The lubricant enters the junction or holder unit A through the tapped opening 10 which feeds the longitudinal bore 11. The bore feeds each of the sockets 12, which in turn feed the transverse diametral passageways 13 and axial bores 14. (See FIG. 1.)

The junction fitting A has a series of bores 15 in the base thereof which permit insertion of the stems 16 of the adapters, which stems are threaded, as indicated at 17. The threaded stems are held in position by means of the hexagon nuts 18 clamped to the bottom face 19 of the junction A.

The stems 16 are provided with the grooves 19 which receive the sealing O-rings 20. (See FIG. 1.)

The adapters B will be drawn into the cup-shaped recess 21 having the oblique shoulder 22 against which rests the beveled face 23 of the lower portion of the cup-shaped adapter B.

The cup-shaped adapter B has a central threaded recess 24 which received the threaded sleeve 25 of the metering fitting C. The metering fitting C has a central cylindrical sleeve 26 serving as a cylinder member and a piston 27 which will be in lowermost position, before the pressure charge, abutting the shoulder 28a and which will be in uppermost position, as shown in FIG. 1, when a pressure charge is applied thereto.

The piston 27 has two grooves 28 and 29 receiving the O-rings 30 and 31.

The piston 27 has the right angle bore 32 which feeds lubricant from the lower chamber 33 to the upper chamber 34. The right angular bore 32 will normally be supplied by the lower groove 28 which is also connected with the transfer bore 35 which leads from the groove or recess 28 to the upper side of the piston 27.

The piston 27 has an upwardly directed sleeve 36 which receives the element 37 in the uppermost position of the piston, as shown in FIG. 1. The sleeve or lip 36 acts against the coil spring 38, which in FIG. 1 is compressed against the top plate 39 and will return the piston after the pressure has been released from the central source.

The top of the cylinder body 26 is threaded, as indicated at 40, and receives a threaded cap 41 which clamps the flange 42 of the transparent dome 43 in the indicated position at the top of the cylinder 26.

Within this dome is received the knurled indicator knob 44 at the end of the rod 45.

This rod 45 has a lower collar or projection 46 and an extension 47. The extension 47 terminates in the threaded portion 48 which is threaded in the interior threaded portion of the sleeve 37. From the side of the body 26 projects the outlet nipple 49 having a connecting bore 50 to the upper chamber 34 which opens into the tapped recess 51 from which connection may be made to a bearing.

In operation, when a lubricant charge is supplied through the inlet recess 10 to the bore 11, the lubricant will flow from the bore 11 into the socket 12 and up against the piston 27. The piston 27 will be forced upwardly, compressing the spring 38.

The O-ring 30 will be rolled back and will seal the inlet of the transfer bore 35 so that all lubricant is held in the inlet storage chamber 33.

The piston will be stopped when the collar 46 contacts the ring or plate 39 at the upper end of the cylinder 26.

As soon as the pressure is released, the stress in spring 38 will act upon the piston to return it. When this occurs, communication will be established through the right angle bore 32 into the groove 28 and thence through the transfer bore 35 through the chamber 34, and the lubricant will be transferred from below the piston 27 to above the piston 27 and will flow through the outlet connections 50 and 51.

When the piston is in up position there will be an indication through the transparent dome D because of the position of the indicating element 44.

In the features shown in FIGS. 1 and 2, the piston diameter may be 5/16 of an inch and the stroke 3/8 of an inch, with the maximum discharge per stroke of about 14 drops of lubricant.

The inlet pressure to start elevation of the piston and at the end of the upward stroke of the piston, as shown in FIG. 1, may be 30 pounds per square inch.

The lubricant will normally be transferred from the chamber 33 to the chamber 34 through the bores in the piston and through the groove 28 and past the sleeve 37 into the chamber 34. A slot such as shown in FIG. 1b will permit ready flow from the top of the piston 27 to the chamber 34.

In the embodiment shown in FIGS. 3 and 4, the junction element E receives the element F and the reciprocating valve element G.

The piston element is returned by a coil spring H and is provided with a stroke adjustment J.

The junction element E has an inlet passageway 75 with mounting openings 76. Each junction element is provided with a recess 77 in communication with the inlet bore 75 which is plugged by means of the lubricant tap plug 78.

The recess 77 communicates with the lower bore, receiving the piston F and the upper bore of larger diameter receiving the piston follower K and also the reciprocating valve element G. The piston element F is press fitted on the stud 79 and it has a groove 80 with the rubber O-ring 81.

The O-ring makes lubricant-tight contact with the walls of the lower bore. The piston F is stopped by the shoulder 82 on the stud 79. On the intermediate portion of the stud, the valve member G is slidably mounted and may reciprocate.

The valve member G has a piston ring or split ring sealing member 83 in a central groove thereof, and it also carries the O-ring 84 which, in its lowermost position, as shown in FIG. 3, has a sealing seat upon the bevel 85.

Through the adapter is positioned the angular by-pass 85a extending from the inlet chamber 77 to the intermediate chamber 87, around the valving member G. (See FIG. 4). In the position of FIG. 3, communication will be cut off from the outlet of the by-pass 85a, but in the position of FIG. 4 such a communication will be established from the by-pass 85a from the inlet chamber 77 to the measuring chamber 87.

The upper piston member K also has a groove 88 with the rubber O-ring 89. The top of the upper piston member K acts upon the coil spring H, compressing it in the position shown in FIG. 4, as indicated.

The upper piston member also has an axial bore 90 which communicates with the measuring chamber 87 and will permit lubricant to flow in the position shown in FIG. 3 into the upper discharge chamber 91.

The upper discharge chamber 91 has a bore 92 in the side nipple 93 leading to the tapped inlet connection socket 94.

The coil spring H encircles the lower portion 95 of the adjustment J, which is threaded at 96 into the upper nipple 97.

The upper nipple 97 has a lower threaded portion 98 which screws into the threaded portion 99 of the body 100, which receives the reciprocating piston structure F-G-K.

The adjustment J may be screwed upwardly and downwardly in the element 97 and then locked in position by the lock nut 101 which abuts against the top face 102 of the body 100.

In the arrangement shown, the lubricant under pressure, when fed in through the inlet 75 to the inlet chamber 77, will force the piston combination F-G-K upwardly, as indicated in FIG. 4, stressing the spring H. When this occurs, lubricant will flow into the chamber 86 and through the angular bore by-pass 85a into the intermediate chamber 87, as shown in FIG. 4.

When the charging pressure is released, the stress spring H will force the piston downwardly into the position of FIG. 3. When this occurs, the intermediate valving member G will be moved downwardly by contact with the upper piston element K until the O-ring 84 strikes the shoulder 85.

When this occurs, the lubricant which has passed into the chamber 86 and thence into the chamber 87 may flow through the axial bore 90 into the chamber 91 and thence upwardly through the bore 92 through a connection to the bore from the tapped socket 94.

Adjustment of the screw J will modify the uppermost position of the piston element K and the stroke of said piston, as well as the amount of volume of the chamber 87.

It will be noted that the valving element G is moved into abutment with the upper element K upon the downward stroke and with the lower element F upon the upward stroke, as respectively shown in FIGS. 3 and 4. On the next up stroke of the piston, any residual lubricant in the chamber 94 will be forced into the bearing through the bore 92 if it has not already flowed thereinto.

In the embodiment of FIGS. 5 to 7, the junction L carries the metering unit M, which has a reciprocating piston N carrying a sliding element P. The device also has the screw adjustment Q for controlling the stroke and the return spring R.

The adapter L has the recess 135 into which is press-fitted the lower nipple portion 136 of the body M. This portion 136 has the groove 137 receiving the O-ring 138. The lower portion of the body has the ring or holder members 139 receiving the central axial plug 140.

This plug 140 is designed to be received within and seal the central opening 141 in the piston element N. The piston element N has the axial bore 141 which communicates with the space above the piston by means of the radial bore 142.

The radial bore 142 is opened or closed by the sliding friction detent member P, which has the sealing split ring 143.

The upper end of the piston has the mushroom element 144 which acts upon the coil spring R, which coil spring at its other end acts upon the bottom of the recess 145 of the closure member 146 has a threaded portion at 47 carrying the threaded shank 148 of the adjustable stop Q.

The adjustable stop Q may be held in adjusted position by the lock nut 149. The lubricant which has passed the piston N will flow into the chamber 150 and may be transported through said chamber through the outlet bore 151 in the side nipple 152.

The side nipple 152 has a tapped recess 153 for connection to a bearing.

The enlargement 154 will serve as a stop to hold the body M in position on the top face 155 of the junction L. The supply bore 156 will feed lubricant to the chambers 135 from the inlet socket 157.

The junctions L have the screw connections 158 which mount the junction L in position upon suitable mounting structures.

In operation, the charge of lubricant will force the piston upwardly, as shown in FIG. 6, stressing the spring R. This will cause a discharge of any lubricant above the piston and in the chamber 150 into the bore 151 to the bearing. At the same time the transverse passage 142 will be closed by this upward movement, as indicated in FIG. 6, and the lubricant will be charged into the storage chamber 159.

When the pressure from the central source is released, the piston N will be returned and the valve element P will change its position to that shown in FIG. 5, permitting the lubricant to flow through the bore 141, the passageway 142 and to the upper side of the piston N. The reciprocating element P will then be in its uppermost position, as indicated in FIG. 5, due to the action of the friction detent 143.

A plug member 140 will plug the bore when it strikes its lowermost position.

In the embodiment of FIGS. 5 and 6 the lubricant is transferred below to above the piston through the axial bore 141, the transverse bore 142, past the friction detent 143 and then past the mushroom 144. The mushroom head and the detent when in position as shown in FIG. 5 and the detent 143 upon returning will permit by-passing of lubricant.

In the embodiment of FIGS. 8 and 9, the lubricant is not transferred from side to side of the piston. As shown, there is an adapter or junction element R which receives the cylinder S having the coil spring T.

The piston U has an extension rod V which serves as an indicator. The valving element consists of a rubber cup element W which permits lubricant to pass in one direction but prevents passage in an opposite direction.

As indicated in FIGS. 8 and 9, the inlet passage 175 has a bore 176 connecting to the chamber permitting flow into the chamber 177. The valving element W will normally seal the bore 176 in the position shown in FIG. 8 by the peripheral lip 179.

However, when pressure is applied the element W will be forced to the left, opening the passageway 176 and the lubricant will then open the lip 179 so it can flow into the chamber 177.

This is shown occurring in FIG. 9.

In this position the plug extension 180 will have its rounded end portion 181 seal the beveled recess 182.

The transverse radial bores 183 will then be prevented from communicating with the outlet bore 184 during the filling operation. It will be noted that the outlet bore 184 communicates with the tapped nipple 185 in FIG. 9. The cylinder S has a lower threaded portion 186 which is threaded into the tapped recess 187 in the junction element R.

The piston has the O-ring 188 which seals the piston against leakage and it has a peripheral lip 189 which rests upon the shoulder or bottom 190 of the recess 187.

The stem V is encircled by the coil spring T which rests at its upper end against the plug 190. The top of the cylinder S is threaded, as indicated at 191, and receives the cap 192.

The stem T has an upwardly projecting portion 193 which is applied at the collar 194. When the end 193 projects, it indicates that the piston U has been charged. When it does not project, it indicates that the piston has discharged to the bearing.

In operation, a charge of lubricant through the inlet bore 176 will force its way past the lip 179, closing the rounded end 181 against the beveled surfaces 182. The lubricant will then flow upwardly through the bore 195 from the chamber 177 into the chamber 196 below the piston U.

When pressure is released, the lip 179 will be forced against the walls of the chamber 177, the rounded portion 181 will be lifted from its seat 182, and the lubricant will then flow from below the piston U and from the piston 196 into the outlet bore 184.

The operation of the various valve members according to the present invention is best exemplified by the embodiment of FIGS. 3 and 4.

In FIG. 4 the by-pass passageway 85a is in the housing while the passageway 90 is in the piston and there is an adjustment J to regulate the stroke. Lubricant pressure will force the piston upwardly when applied to the inlet 75 and the lubricant will flow into the inlet chamber 77 and through the by-pass 85a into the intermediate chamber 87. This is the position shown in FIG. 4.

When the pressure is released the valving member G will be moved downwardly by the spring H until the O-ring 84 strikes the shoulder 85. This will force the lubricant to flow via the space between the valve G and the piston F through the axial bore 90 into the discharge chamber 91 and thence through the outlet 92 to the bearing. This is the position shown in FIG. 3.

In FIG. 1 there is a similar operation. In FIG. 1 the lubricant charge is supplied through the inlet 10 into the socket 12 and into the chamber 33 against the piston 27. This will force the piston 27 upwardly compressing the spring 38.

The O-ring 28 will be rolled back and will seal the inlet of the right angle bore 32 as shown in FIG. 1.

The piston is stopped when it receives the lower end of the sleeve 37 and when the collar 46 contacts the ring or plate 39, the spring 38 returns the piston and establishes communication through the right angle bore 32 into the groove 28, hence from the transfer bore 35 to the chamber 34. See FIG. 1a.

This will transfer the lubricant from below the piston 27 to above the piston 27 and permit it to flow outwardly to the bearing at 51. The extension 51 gives a visual indication.

In FIGS. 1, 1a and 1b the O-ring 30 acts to cut off or permit passage of lubricant. In FIG. 1a the O-ring 30 is sealing off the transfer bore 35 and opening the right angular passageway 32. There is a slot (not shown) through the lower part of the structure at the position indicated at 37 in FIG. 1 so that lubricant can flow from the right angular passageway 32 below the element 47 and then out into the discharge passage 50.

It is thus apparent that the applicant has provided a simple, effective metering valving arrangement to be positioned at the bearings and which serves to meter the lubricant accurately to the bearings from a central pressure discharge.

As many changes could be made in the above lubrication, and many widely different embodiments of this invention could be made without departure from the scope of the claims, it is intended that all matters contained in the above description shall be interpreted as illustrative and not in a limiting sense.

Having now particularly described and ascertained the nature of the invention, and in what manner the same is to be performed, what is claimed is:

1. In a centralized lubrication installation, a lubricant metering unit of the reciprocating piston type receiving a stored charge of lubricant upon application of a pressure input through an inlet from a central pressure source, said unit comprising a body with a bore therethrough having two end portions, a first closure means sealing one end portion of said bore, a coaxial piston, valve and piston follower reciprocable in said bore, a spring acting in said bore between said first closure means and said piston follower, said valve being slidable between first and second limits defined by said piston and said piston follower respectively, a second closure means sealing the other end portion of said bore, an inlet chamber defined by said second closure means and said other end portion of said bore, an inlet communicating with said inlet chamber, a discharge chamber defined by said first closure means and said one end portion of said bore, an outlet communicating with said discharge chamber, a by-pass having a first end communicating with said inlet chamber and a second end communicating with said bore, a passage in said piston follower having a first end communicating with said discharge chamber and a second end communicating with said bore whereby when a pressure input occurs at said inlet, said piston follower is moved into abutting relationship with said first closure means compressing said spring and thereby sealing said first end of said passage, said valve is moved to said second limit thereby sealing said second end of said passage and said piston is moved into abutting relationship with said valve, and whereby when said pressure input is relieved at said inlet, said spring is allowed to expand and said piston is moved thereby into abutting relationship with said second closure means, said valve is moved to said first limit thereby opening said second end of said passage, and said piston follower is moved into abutting relationship with said valve thereby opening said first end of said passage, the stored charge of lubricant in said inlet chamber being forced by said piston through said by-pass, said passage and said discharge chamber to said outlet.

2. The installation of claim 1 wherein said first closure means comprises an element having a lower portion projecting into said bore with a flattened end adapted to seal said first end of said passage and means to adjust said element whereby the extent to which said extension portion projects into said bore may be varied.

References Cited in the file of this patent
UNITED STATES PATENTS

| | | |
|---|---|---|
| 1,818,347 | Murphy | Aug. 11, 1931 |
| 1,942,096 | Hallerberg | Jan. 2, 1934 |
| 2,147,830 | Davis | Feb. 21, 1939 |
| 2,184,172 | Venable | Dec. 19, 1939 |
| 2,742,978 | Peterson et al. | Apr. 24, 1956 |